United States Patent
Kamiyama et al.

(10) Patent No.: US 9,194,528 B2
(45) Date of Patent: Nov. 24, 2015

(54) PIPE REHABILITATION METHOD

(71) Applicant: SHONAN GOSEI-JUSHI SEISAKUSHO K.K., Kanagawa-ken (JP)

(72) Inventors: Takao Kamiyama, Kanagawa-ken (JP); Koji Kaneta, Kanagawa-ken (JP); Kenji Fujii, Kanagawa-ken (JP); Makoto Ishida, Kanagawa-ken (JP); Takeshi Hasegawa, Kanagawa-ken (JP)

(73) Assignee: SHONAN GOSEI-JUSHI SEISAKUSHO K.K. (JP)

( * ) Notice: Subject to any disclaimer, the term of this patent is extended or adjusted under 35 U.S.C. 154(b) by 0 days.

(21) Appl. No.: 14/191,603

(22) Filed: Feb. 27, 2014

(65) Prior Publication Data

US 2014/0246108 A1  Sep. 4, 2014

(30) Foreign Application Priority Data

Mar. 1, 2013  (JP) .................................. 2013-040247

(51) Int. Cl.
*F16L 55/18*  (2006.01)
*F16L 55/162*  (2006.01)
*F16L 55/1645*  (2006.01)

(52) U.S. Cl.
CPC ......... *F16L 55/162* (2013.01); *F16L 55/16455* (2013.01)

(58) Field of Classification Search
CPC ...... F16L 55/162; F16L 55/163; F16L 55/165
See application file for complete search history.

(56) References Cited

U.S. PATENT DOCUMENTS

| | | | | |
|---|---|---|---|---|
| 3,685,545 | A * | 8/1972 | Smith et al. ..................... | 138/99 |
| 7,017,613 | B2 * | 3/2006 | Miura et al. ..................... | 138/98 |
| 2003/0136455 | A1 * | 7/2003 | Kamiyama et al. ............. | 138/98 |
| 2005/0236058 | A1 * | 10/2005 | Kamiyama et al. ............. | 138/98 |
| 2005/0238437 | A1 * | 10/2005 | Kamiyama et al. ........ | 405/184.1 |
| 2005/0252565 | A1 * | 11/2005 | Kamiyama et al. ............. | 138/98 |
| 2010/0139799 | A1 * | 6/2010 | Kamiyama et al. ............. | 138/98 |

* cited by examiner

*Primary Examiner* — Benjamin Fiorello
(74) *Attorney, Agent, or Firm* — Adams & Wilks (57) ABSTRACT

In a pipe rehabilitation method, segments are linked in the circumferential and pipe-length directions to install a rehabilitation pipe inside an existing pipe. Nuts are secured to the segments along the circumferential direction thereof. Linking members each configured to be screwed into one of the secured nuts are inserted into each segment. Each linking member is temporarily locked to the segment to prevent the inserted linking member from falling out of the segment. The segment into which the linking members are inserted and temporarily locked and one of the segments to which the nuts are secured are aligned relative one another, and the linking members are screwed into the respective nuts to fasten both segments together and link them in the pipe-length direction.

14 Claims, 9 Drawing Sheets

PIPE REHABILITATION METHOD

BACKGROUND OF THE INVENTION

1. Field of the Invention

The present invention relates to a pipe rehabilitation method for installing a rehabilitation pipe inside an existing pipe using segments each of which comprises an inner surface plate constituting an inner circumferential surface, and side plates and end plates provided upright on peripheral edges of the inner surface plate, these plates being formed integrally from a plastic material and linked in the circumferential direction and in the pipe-length direction.

2. Description of the Related Art

In cases in which a sewage pipe or another pipeline buried underground has deteriorated through aging, a pipe lining method has been proposed and practiced in which a lining is provided to the inner circumferential surface thereof to repair the pipeline without excavating it from the ground.

In this pipe lining method, a pipe lining material made of a tubular resin absorbent material impregnated with an uncured thermosetting resin is everted and inserted into a pipeline using fluid pressure, and is pressed by fluid pressure against the inner peripheral wall of the pipeline. The lining material is then heated using a desired method to cure the thermosetting resin therein and form a plastic pipe, thereby repairing the pipeline.

There is also known a lining method using segments each comprising an inner surface plate constituting an inner circumferential surface, side plates and end plates provided upright on the peripheral edges of the inner surface plate, these plates being integrally formed from a plastic material. The segments are linked in the circumferential direction to assemble short pipe units, which are then linked in the pipe-length direction to construct a rehabilitation pipe inside an existing pipe (for example, JP-A 2011-12803). Such a pipe rehabilitation method is used for large-diameter existing pipes. In this method, after assembling a rehabilitation pipe inside the existing pipe, grout or another filler material is injected into a space between the existing pipe and the rehabilitation pipe and hardened to construct a composite pipe.

In the rehabilitation pipe described in JP-A 2011-12803, segments are successively carried into a manhole and coupled in the circumferential direction to assemble a pipe unit. A plurality of nuts are secured to each segment of the assembled pipe unit, and the pipe units with the nuts secured thereto are brought into contact with each other. A bolt is inserted into the segment of one pipe unit and screwed into the nut secured to the segment of the other pipe unit to fasten both segments together, thus linking both pipe units in the pipe-length direction.

However, the bolts are inserted into the segment and tightened at a dark site by an operator. This makes the rehabilitation operation more complex and inefficient, necessitating time and labor.

It is therefore an object of the present invention to provide a pipe rehabilitation method that is capable of easily linking the segments in the pipe-length direction to reduce labor during pipe rehabilitation operations.

SUMMARY OF THE INVENTION

The present invention provides a pipe rehabilitation method in which segments are linked in the circumferential and pipe length directions to install a rehabilitating pipe inside an existing pipe. Each of the segments comprises an inner surface plate, side plates provided upright on both sides extending in the circumferential direction of the inner surface plate, and inner plates provided upright between the side plates. In the method, a plurality of nuts is secured to the segments along the circumferential direction thereof. A linking member that can be screwed into the nut is prepared and inserted into a segment. The segment into which the linking member is inserted and the segment to which the nut is secured are aligned, and the linking member is screwed into the nut to fasten both the segments together and link them in the pipe length direction. A temporary lock is mounted on the segment to temporarily lock the linking member to the segment and prevent the inserted linking member from falling out therefrom.

According to the present invention, the linking member for linking the segments in the pipe-length direction is temporarily locked to the segment using a temporary lock so as not to fall out therefrom. Therefore, the temporarily locked linking member is simply pushed and screwed into the nut to link both the segments in the pipe-length direction. Thus, the segments are easily linked in the pipe-length direction, saving labor during pipe rehabilitation operations.

Further features of the invention, its nature and various advantages will be more apparent from the accompanying drawings and following detailed description of the invention.

DETAILED DESCRIPTION OF THE PREFERRED EMBODIMENTS

The present invention will now be described with references to embodiments illustrated in the accompanying drawings. The present invention is suitable for rehabilitating or repairing sewage pipes, water supply pipes, tunnels, agricultural irrigation channels, and other existing large-diameter pipes. In the present embodiment, the rehabilitation pipes are described as having a circular cross-section profile orthogonal to the pipe-length direction. However, it shall be apparent that the present invention can be applied to a rehabilitation pipe having a square or another non-circular cross-section. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

Figure 3:
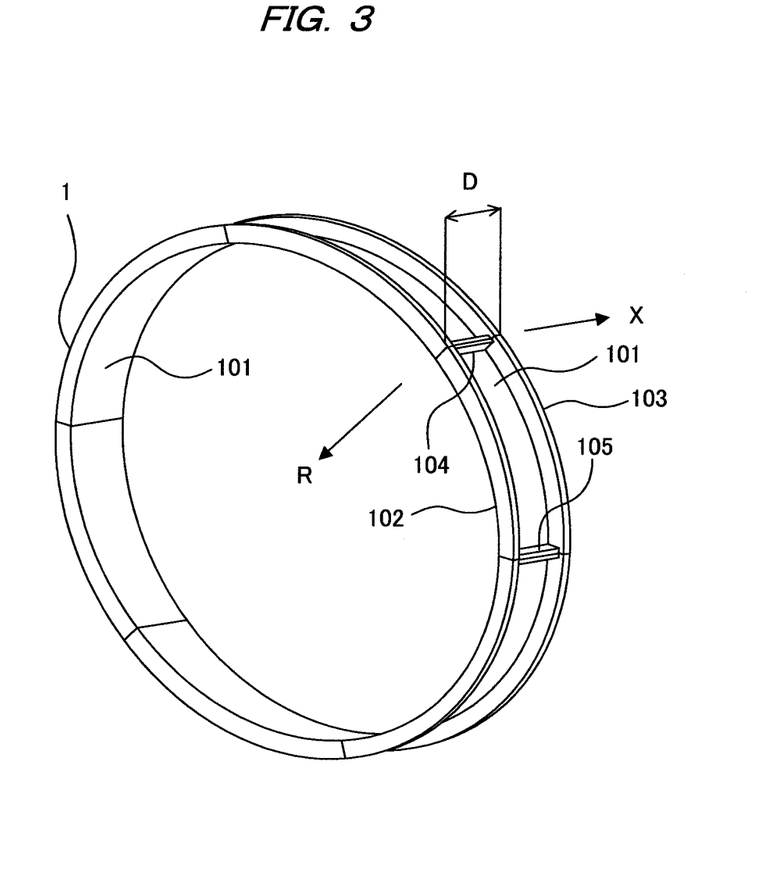
FIG. 3 is a perspective view showing a state in which the segments are linked in the circumferential direction to assemble a pipe unit.

In the present specifications, the pipe-length direction refers to the direction indicated by arrow X extending in the longitudinal direction of a pipe unit 10 in FIG. 3, the radial direction refers to the direction indicated by the radial arrow R pointing towards the center axis of the pipe unit 10, and the circumferential direction refers to the direction of the circumference of the circle forming the pipe unit 10.

Figure 1:
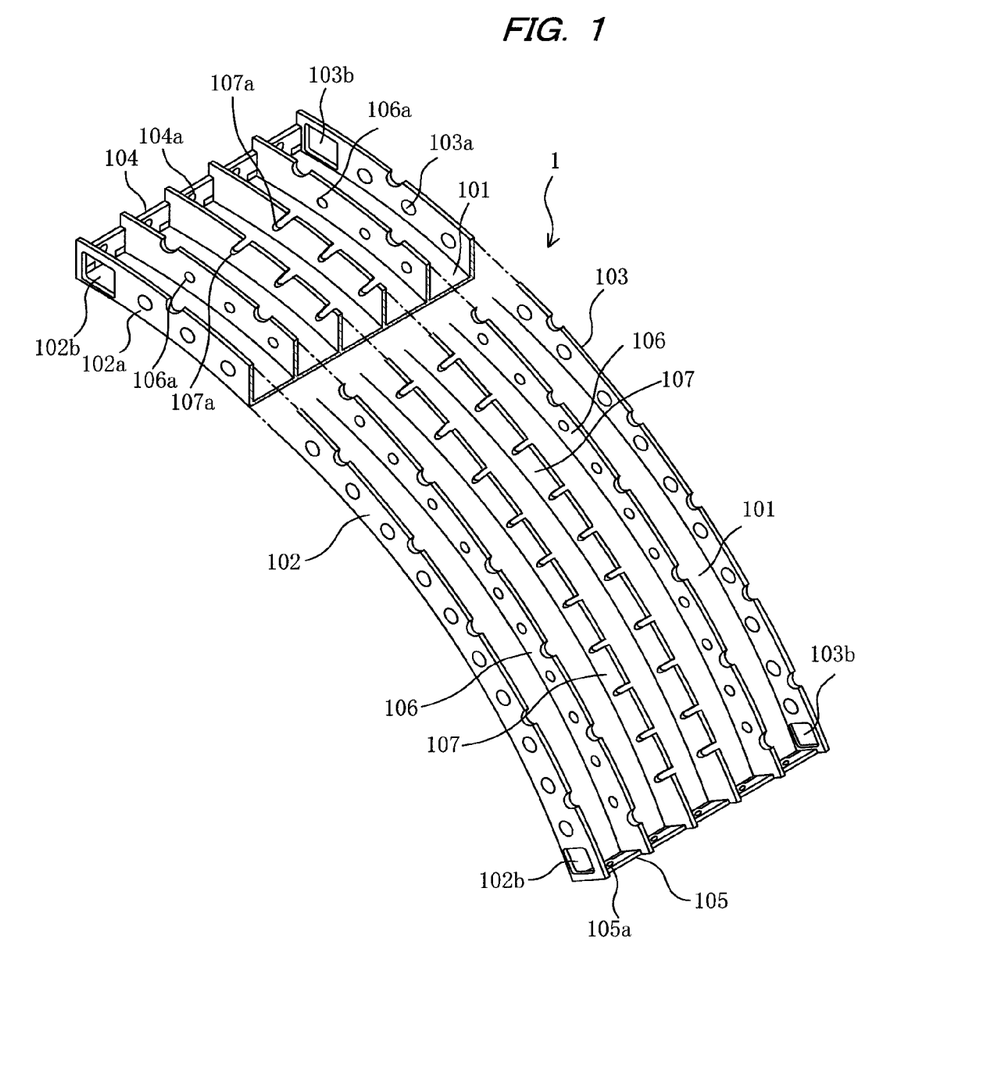
FIG. 1 is a perspective view showing the structure of a segment used in assembling the rehabilitation pipe.

FIG. 1 shows the structure of a segment 1 for pipe rehabilitation (hereafter simply referred to as "segment"), which represents an assembly unit member of a rehabilitation pipe for rehabilitating an existing pipe. The segment 1 is an integrally formed block-shaped member made from a plastic material, comprising an inner surface plate 101 constituting an inner circumferential surface of the rehabilitation pipe, side plates 102, 103 provided vertically upright on both sides extending in the circumferential direction of the inner surface plate 101, and end plates 104, 105 provided vertically upright on both ends extending in the pipe-length direction of the inner surface plate 101.

In the present embodiment, the segment 1 has a shape that is curved as an arc representing a predetermined angle that equally divides the circumference, e.g., a 60° arc that divides the circumference into sixths. However, the segment is not limited to that having an arc or a fan shape. The segment may be shaped as, e.g., a cuboid or a shape that is bent so as to have a curved right angle depending on the cross-section profile or the size of the existing pipe or the location of the existing pipe to be repaired.

A plurality (four in the present embodiment) of inner plates 106, 107 having a shape similar to that of the side plates are provided upright at equal intervals and parallel to the side plates 102, 103 on the upper surface of the inner surface plate 101 and on the inside relative to the side plates 102, 103 in order to reinforce the mechanical strength of the segment 1. One or both of the inner plates 106, 107 can be omitted if the segment 1 has sufficient strength.

A plurality of holes 102a for admitting insertion of a linking member for linking the segment 1 in the pipe-length direction are provided at equal intervals along the circumference on the lower section 102e of the side plate 102. The holes 102a in the side plate 102 and holes 103a in the side plate 103 are located at coinciding positions along the circumferential direction, allowing the linking member to be inserted through the holes 102a and 103a in the side plates 102 and 103.

Openings 102b, 103b, used for a linking operation of the segments in the circumferential direction, are provided to the side plates 102, 103 at both ends in the vicinity of the end plates 104, 105. When the segments are connected in the circumferential direction, a bolt, a nut, or another linking member is, e.g., positioned or tightened through the openings 102b, 103b.

The end plates 104, 105 are disposed between the side plate 102 and the side plate 103. The height of the end plates 104, 105 from the outer surface of the inner surface plate 101 is slightly lower than that of the side plates 102, 103. Provided on the end plates 104, 105 are circular insertion holes 104a, 105a for admitting insertion of a bolt or another linking member for linking the segment 1 in the circumferential direction.

The inner plate 106 is a thin-plate member having a profile substantially identical to the side plates 102, 103. Circular insertion holes 106a for admitting insertion of linking members for linking the segments in the pipe-length direction are provided at equal intervals on the inner plate 106. The positions of the insertion holes 106a in the circumferential direction coincide with those of the insertion holes 102a of the side plate 102 in the circumferential direction.

The inner plate 107 is a thin-plate member having a profile substantially identical to the side plates 102, 103, and a plurality of notches 107a are provided thereon. The notches 107a have a half-moon shape in which the lower portions thereof function to admit insertion of linking members. The positions of the notches 107a in the circumferential direction coincide with those of the insertion holes 102a, 103a, 106a of the side plates 102, 103 and the inner plate 106 in the circumferential direction.

The inner surface plate 101, the side plates 102, 103, the end plates 104, 105, and the inner plates 106, 107 are all made from an identical transparent, semi-transparent or opaque plastic material, and are integrally formed using a known molding technique.

Figure 2A:
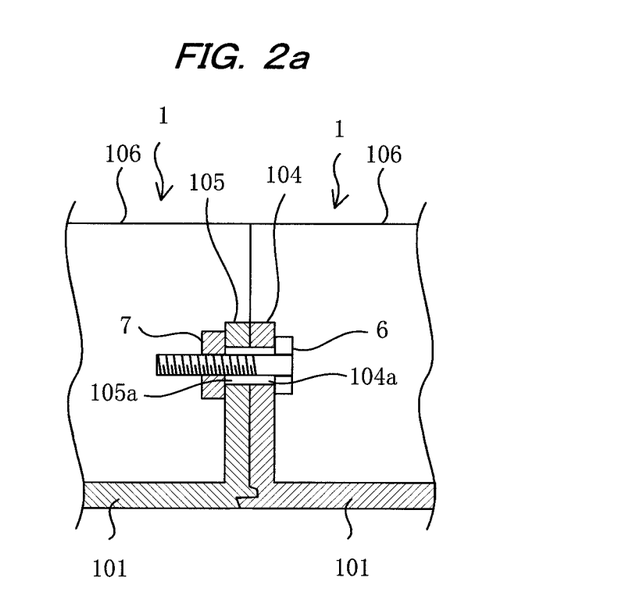
FIG. 2a is a cross-sectional view showing circumferentially linked segments.
Figure 2B:
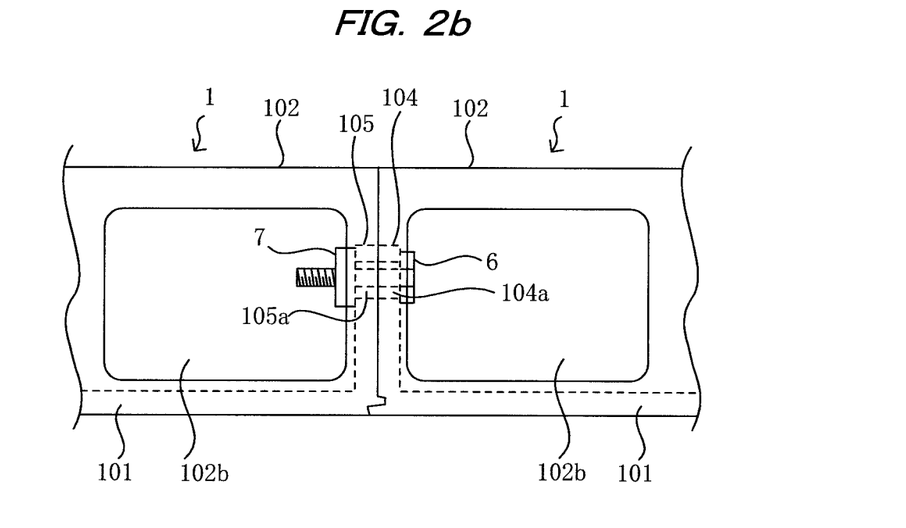
FIG. 2b is a front view showing circumferentially linked segments.

FIGS. 2a and 2b show a method for linking the segments 1 in the circumferential direction. Two segments 1, 1 are held so that the end plate 105 of one of the segments and the end plate 104 of the other segment are aligned in contact with each other. A wrench or another tool, or a technician's finger, is inserted from the opening 102b in the side plate 102 of the segment, and a bolt 6 is inserted into the insertion holes 104a, 105a. A nut 7 is then threadedly engaged to the bolt 6, thereby fastening both end plates 104, 105 together and linking the two segments 1, 1 in the circumferential direction.

Bolting as described above is performed in two locations, i.e., between the side plate 102 and the adjacent inner plate 106, and between the side plate 103 and the adjacent inner plate 106. In an instance in which the linking in two locations as described above results in insufficient linking strength, a linking member is also positioned in other insertion holes 104a, 105a, from above the segment, between the inner plates 106, 107 to strengthen the linking in the circumferential direction.

By sequentially linking the segments 1 in the circumferential direction around the full circumference, it is possible to assemble a closed ring-shaped short pipe assembly 10 (hereafter referred to as "pipe unit") having a predetermined small length in the pipe-length direction X as shown in FIG. 3. The pipe unit 10 has a shape that can be obtained when a circular pipe is sliced at a predetermined width D perpendicularly to the pipe-length direction X. The outside diameter of the pipe unit 10 is slightly smaller than the inside diameter of the existing pipe to be rehabilitated. The segment 1 corresponds to a member obtained by dividing the pipe unit 10 into a plurality of (preferably equal) portions along a cutting surface parallel to the radial direction R.

In FIG. 3, the inner surface plate 101, the side plates 102, 103, and the end plates 104, 105, which are the principal structural members of the segment 1, are shown. In order to prevent the drawing from becoming complicated, the inner plates 106, 107 and other reinforcement structures are not shown.

Figure 4:
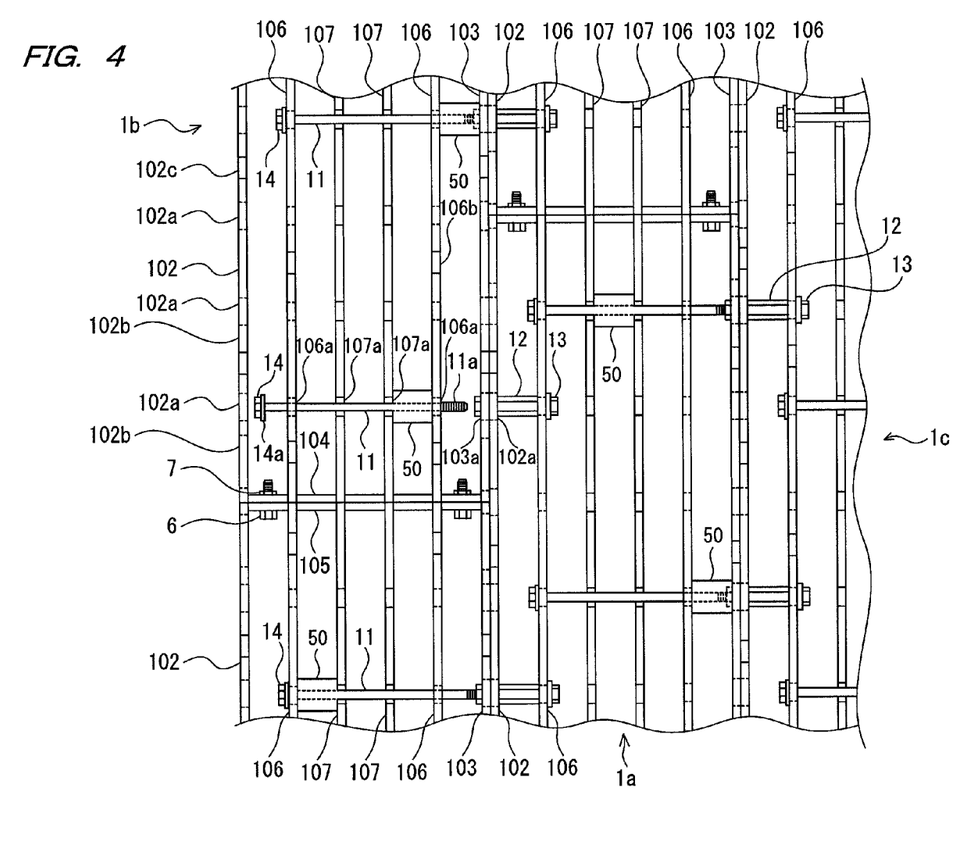
FIG. 4 is an illustrative view showing a state in which the segments of the pipe units are linked in the pipe-length direction using linking members.

Each of the segments in the pipe unit 10 of such description is linked to a segment of another pipe unit using a linking member (tightening member) 11 extending in the pipe-length direction and a nut 12, as shown in FIGS. 4 and 5, for extension in the pipe-length direction.

Figure 6:
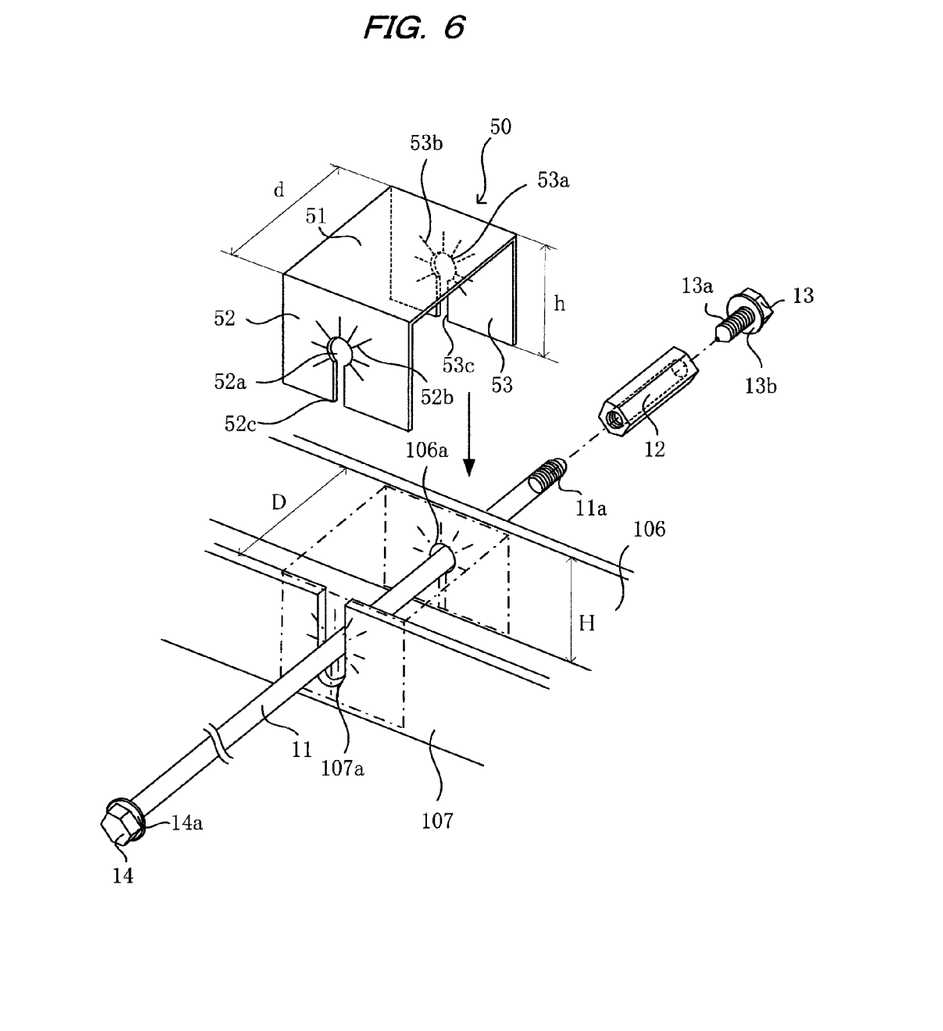
FIG. 6 is a perspective view showing a state in which a linking member is temporarily locked to the segment using one embodiment of a temporary lock.

The linking member 11 is, as shown in FIG. 6, a metallic bolt that has at one end a screw part 11a screwed into the nut 12, and at the other end a hexagonal part 14 with a flange 14a. The linking member 11 is circular in cross section and has such a diameter as to be capable of passing through the insertion holes 102a, 103a, 106a, and the notches 107a of the segment. The diameter of insertion holes 102a, 103a is larger than that of the insertion holes 106a and the notches 107a, and the flange 14a is shaped so as to be capable of passing through the insertion holes 102a, 103a of the side plates 102, 103, but not through the insertion holes 106a and the notches 107a in the internal plates 106, 107.

Figure 5A:
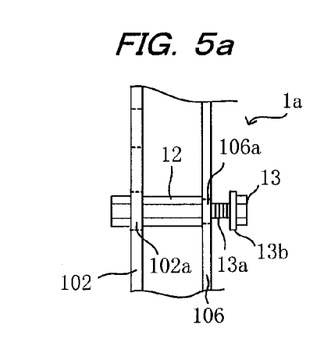
FIGS. 5a through 5e are illustrative views each showing in what manner the segments are linked in the pipe-length direction using the linking member and the nut.
Figure 5B:
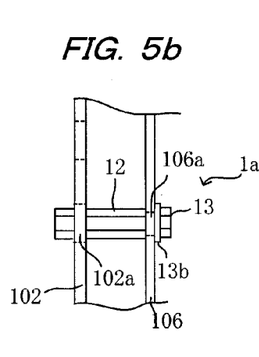

When the segments are linked in the pipe-length direction, the nut 12 is secured to the segment at a plurality of locations in the circumferential direction. As shown in FIG. 5a, the nut 12 is passed through the insertion hole 102a in the side plate 102 of one segment 1a and brought into contact with the first inner plate 106, i.e., the inner plate 106 positioned nearest to the side plate 102. A bolt 13 having a screw part 13a and a flange 13b is inserted into the insertion hole 106a of the inner plate 106 from the other side and threaded into the nut 12. The nut 12 is thus fastened against the inner plate 106 and secured against it, as shown in FIG. 5b.

The nut 12 may be secured to the segment 1 after the segments are linked in the circumferential direction as shown in FIG. 3, or the segments may be linked in the circumferential direction so as to constitute the pipe unit 10 after the nut 12 is first secured to the segment 1.

Figure 5C:
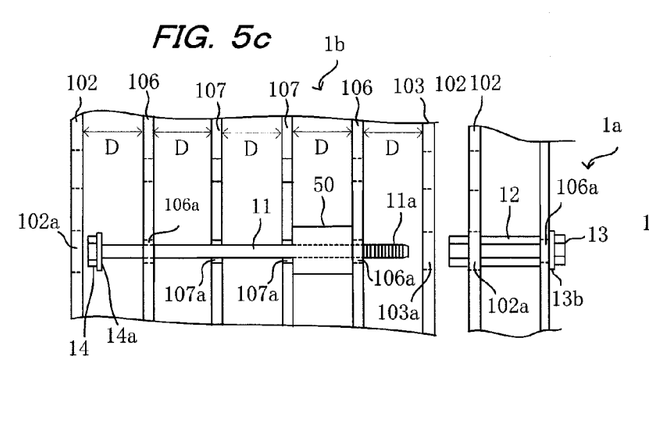

As shown in FIGS. 5c and 6, the linking member 11 is inserted into the segment 1b that is to be linked to the segment 1a to which the nut 12 is secured. The linking member 11 is temporarily locked to the segment 1b using a temporary lock 50 (temporary lock member) in order to prevent the inserted linking ember 11 from falling out from the segment 1b.

The temporary lock 50 is comprised of an elastic flexible sheet of plastics such as PET, polypropylene or the like. The temporary lock 50 comprises an integral upper sheet 51 and side sheets 52, 53 that are perpendicularly provided at both ends of the upper sheet 51. The width d of the upper sheet 51 in the pipe-length direction is substantially the same as the distance between the inner plates 106, 107 and the height h of the side sheets 52, 53 is substantially the same as the height H of the inner plates 106, 107.

Openings 52a, 53a having a diameter slightly smaller than that of the linking member 11 are formed at the central portion of the side sheets 52, 53. One or a plurality of breaks 52b, 53b extending radially from the center of the openings 52a, 53a are formed on the side sheets 52, 53 so that the linking member 11 can be easily pushed and inserted into the openings 52a, 53a. Furthermore, notches 52c, 53c that extend downwardly from the openings 52a, 53a are formed in the side sheets 52, 53. The notches 52c, 53c are shaped so as to allow the linking member 11 to pass vertically therethrough for insertion into the openings 52a, 53a of the temporary lock 50.

With such a configuration, the linking member 11 is inserted into the insertion holes 102a, 106a and the notches 107a of the side plate 102 and the inner plates 106, 107 of the segment 1b, and moved in the pipe-length direction until the distal end of the screw part 11a of the linking member 11 comes near the side plate 103, as shown in FIG. 5c.

In this state, the temporary lock 50 is brought down toward the linking member 11 that is located between the inner plates 106, 107. When the temporary lock 50 is brought down until the linking member 11 passes through the notches 52c, 53c and fits into the openings 52a, 53a, the temporary lock 50 is sandwiched between the inner plates 106, 107 and remains in a state where it cannot be moved in the pipe-length direction. Since the diameter of the linking member 11 is larger than that of the openings 52a, 53a, the break portions 52b, 53b shift in the pipe-length direction and the openings 52a, 53a are so widened in diameter that the side sheets 52, 53 come into frictional contact with the circumferential surface of the linking member 11. The frictional resistance due to the frictional contact depends on the diameter of the openings 52a, 53a and the number of the breaks 52b, 53b of the temporary lock 50. Accordingly, the diameter of the openings 52a, 53a and/or the number of the breaks 52b, 53b are so set that a frictional resistance is produced between the linking member 11 and the temporary lock 50 for preventing the linking member 11 from removing from the openings 52a, 53a and dropping out of the segment by its own weight.

In FIG. 6, the linking member 11 is first inserted into the segment and then the temporary lock 50 is mounted between the inner plates 106, 107. Alternatively, the temporary lock 50 may be first disposed between the inner plates 106, 107 and then the linking member 11 may be inserted into the openings 52a, 53a of the temporary lock 50 to temporarily lock the linking member 11 to the segment.

In FIGS. 5c and 6, the temporary lock 50 is mounted between the inner plates 106, 107. However, as shown in FIG. 4, the temporary lock 50 may be mounted between the side plate 103 and the inner plate 106 or between the inner plates 107, 107 for temporary lock of the linking member to the segment.

Figure 7:
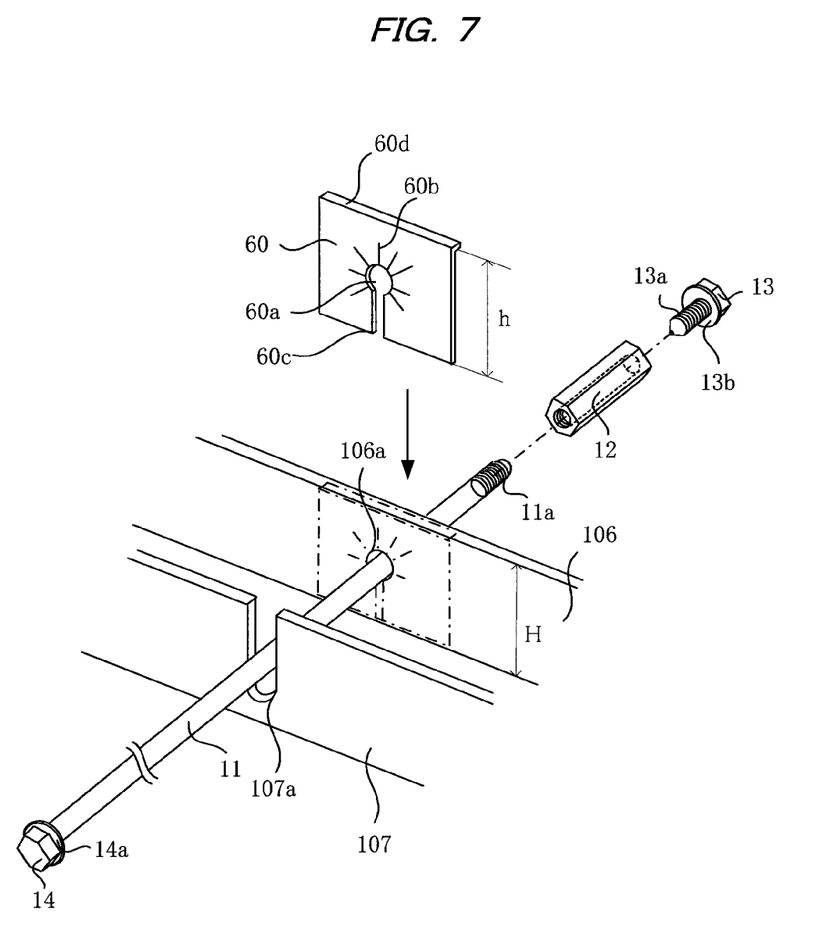
FIG. 7 is a perspective view showing a state in which a linking member is temporarily locked to the segment using another embodiment of a temporary lock.

As illustrated in FIG. 7, temporary locking may be performed using a temporary lock 60 comprised of one sheet. The temporary lock 60 is made from the same material as the temporary lock 50, and is the same in shape as the side sheets 52, 53 with its height h substantially the same as the height H of the inner plates 106, 107. The temporary lock 60 is provided at its center with an opening 60a having the same shape and size as the openings 52a, 53a of the temporary lock 50, and one or a plurality of breaks 60b similar to the breaks 52b, 53b of the temporary lock 50 is formed, extending radially from the center of the opening 60a. The temporary lock 60 is further provided with a vertically extending notch 60c similar to the notches 52c, 53c. The temporary lock 60 is bent at the upper portion at a right angle, and its upper portion is adhesively secured to the upper portion of the inner plate 106, or the temporary lock 60 is fixed to the inner plate 106 using an adhesive sheet.

The temporary lock 60 has the same configuration and function as the side sheet 52 or 53 of the temporary lock 50, and provides the same advantages as the side sheet 52 or 53. The temporary lock 60 may be mounted not only on one inner plate, but also on another inner plate or side plate to provide an enhanced temporary lock function.

Figure 5D:
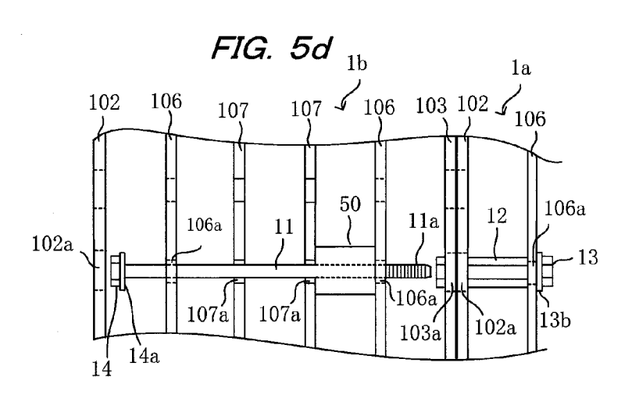

Once the linking member 11 has been temporarily locked to the segment 1b, the segments 1a, 1b are, as shown in FIG. 5c, aligned to each other so that the linking member 11 can be screwed into the nut 12 secured to the segment 1a. The nut 12 of the segment 1a is then inserted into the insertion hole 103a in the side plate 103 of the segment 1b to place the segments 1a, 1b against each other, as shown in FIG. 5d.

Figure 5E:
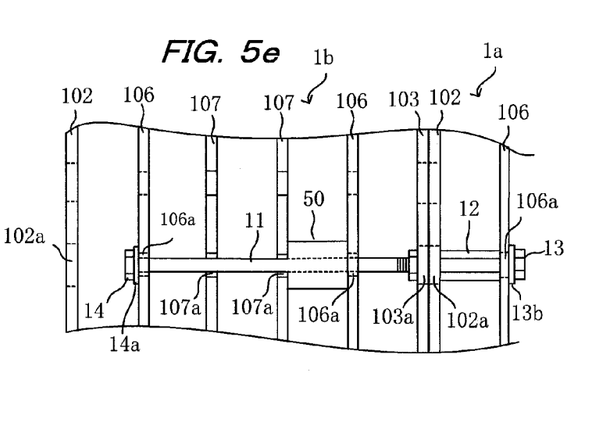

The frictional resistance produced between the linking member 11 and the temporary lock 50 temporarily locks the linking member 11. However, using tools or human power allows the linking member 11 to be moved in the pipe-length direction against the frictional resistance until it comes into contact with the nut 12. Electric tools are then used to screw the linking member 11 into the nut 12 until the flange 14a of the linking member 11 presses against the leftmost inner plate 106 of the segment 1b, thereby fastening and fixing the two segments 1a, 1b as shown in FIG. 5e.

FIG. 4 shows a state in which the linking members 11 each of which is temporarily locked by the temporary lock 50 are screwed into the nuts 12 to link the segments in the pipe-length direction.

A plurality of the nuts 12 are fixed along the circumferential direction to each segment, the nuts 12 being fixed to every second hole 102a, or at less regular intervals, depending on the required strength. In the example shown in FIG. 4, the segments are linked in the pipe-length direction with the nut positions in each segment being displaced in the circumferential direction relative to the nut positions in the segment adjacent to the segment in question. For example, the positions of the nuts 12 in the segment 1a in the center are displaced relative to the positions of the nuts 12 in the segments 1b, 1c adjacent to the segment 1a by an amount corresponding to the intervals between the holes 102a in the side plate 102 as viewed in the circumferential direction. Such a linking enhances the strength of the rehabilitation pipe.

A description will now be given for a method for rehabilitating an existing pipe using the segments configured as described above.

Figure 8:
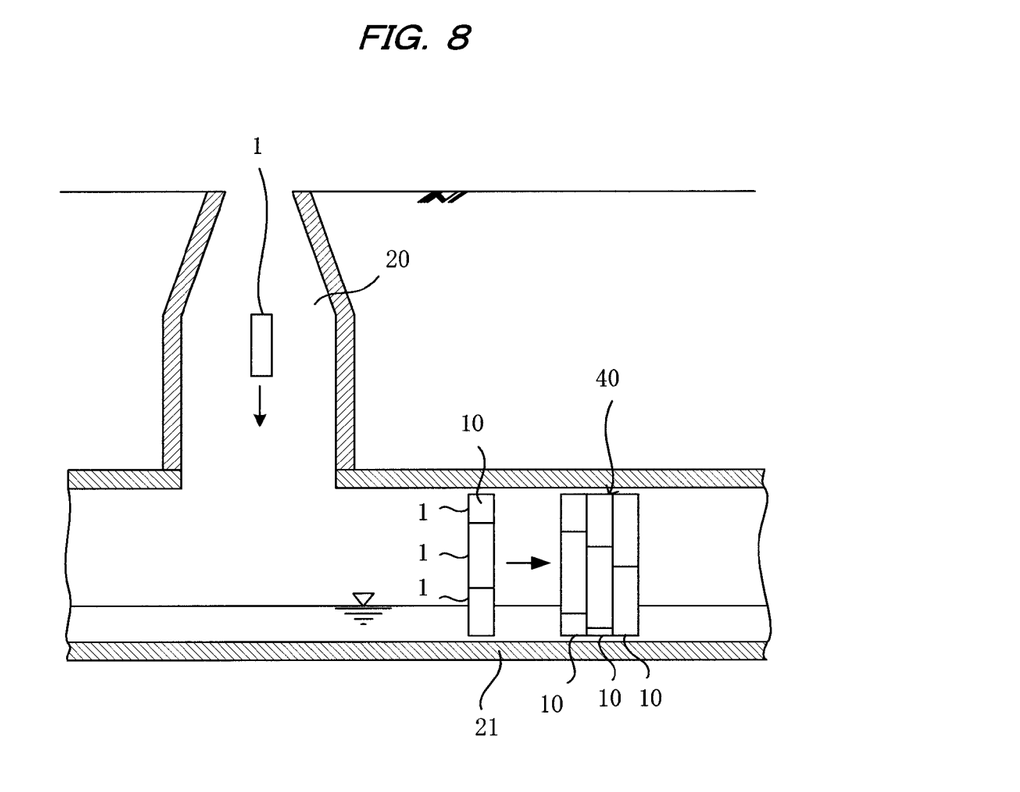
FIG. 8 is an illustrative view showing a state in which the pipe units are linked and the rehabilitation pipe is installed in the existing pipe.

First, as shown in FIG. 8, the segment 1 is carried through a manhole 20 into an existing pipe 21, and as shown in FIGS. 2a, 2b and 3, the segments are sequentially linked in the circumferential direction to assemble the pipe unit 10. The nut 12 may be secured to the segment 1 before or after the segment 1 is carried into the manhole 20, or may be secured thereto after the pipe unit 10 has been assembled in the manhole 20.

The linking members 11 are temporarily locked to the segments using the temporary locks 50, 60 that are mounted at locations at which the nuts 12 are secured to the segments to be linked. Such a temporary locking operation is performed before factory shipment or at a construction site on the ground, or before or after assembly of the pipe unit inside the manhole. As described above, the linking member is first inserted into the segment and then the temporary lock is mounted thereto, or the temporary lock is first mounted and then the linking member is inserted into the segment.

The pipe units with the linking members temporarily locked are successively transported into the existing pipe and linked to the pipe units already disposed in the existing pipe. Such a linking operation is performed as shown in FIGS. 4 and 5, as described above.

Figure 9:
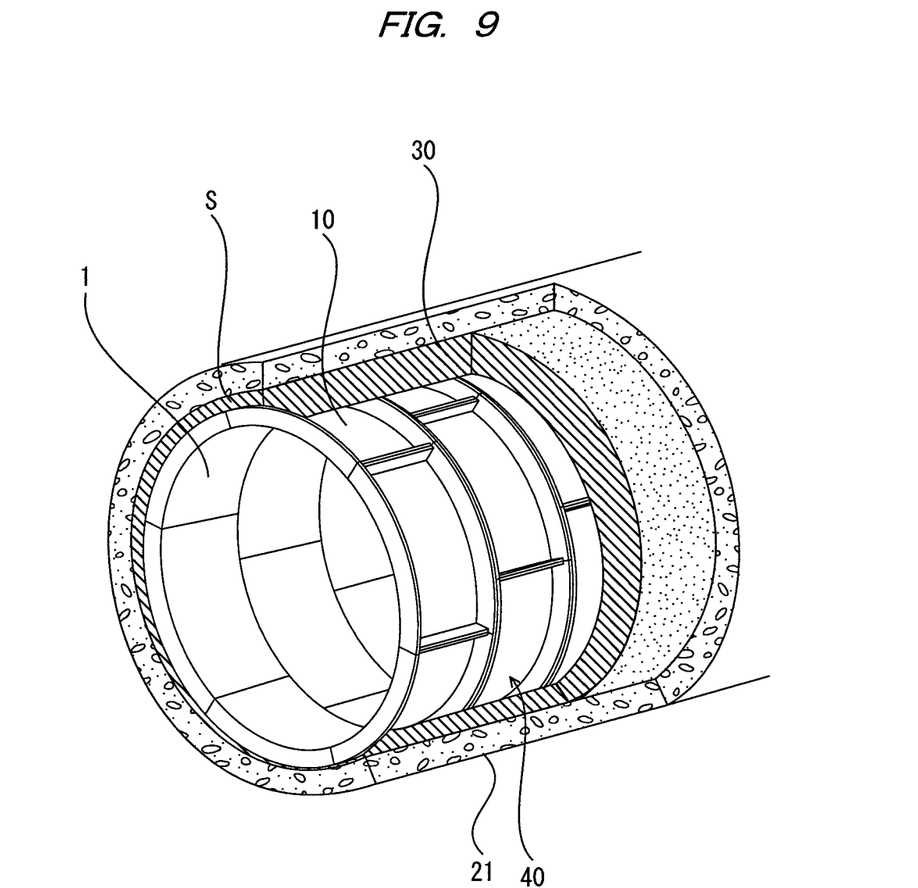
FIG. 9 is a perspective view showing a state in which the pipe units are linked and the rehabilitation pipe is installed in the existing pipe.

Thus, the pipe units 10 are sequentially linked in the pipe-length direction to install the rehabilitation pipe 40 inside the existing pipe 21, as shown in FIGS. 8 and 9. In FIGS. 8 and 9, the linking members 11 and similar elements are not shown, and the segments are shown in a simplified manner. The temporary locks remain in the segments because it is unnecessary to remove them after installation of the rehabilitation pipe.

Next, as shown in FIG. 9, a filler material 30 such as a grout material or the like is injected into a space S between the rehabilitation pipe 40 and the existing pipe 21, and the filler material is hardened. For injection of the filler material, an injection hole is formed in, e.g., the inner surface plate 101, and the filler material 30 is injected therefrom. The injected filler material 30 allows the existing pipe 21 and the rehabilitation pipe 40 to be solidly bound when it is hardened, and it becomes possible to create a composite pipe comprising the existing pipe, the filler material, and the rehabilitation pipe.

What is claimed is:

1. A pipe rehabilitation method in which segments are linked in the circumferential and pipe-length directions to install a rehabilitation pipe inside an existing pipe, each of the segments comprising an inner surface plate, side plates provided upright on both sides extending in the circumferential direction of the inner surface plate, and inner plates provided upright between the side plates, the method comprising:
   securing a plurality of nuts to the segments along the circumferential direction thereof;
   preparing a linking member that can be screwed into one of the secured nuts;
   inserting the linking member into a segment;
   temporarily locking the linking member to the segment to prevent the inserted linking member from falling out of the segment using a temporary lock comprised of a sheet having at its center an opening for admitting insertion of the linking member;
   disposing the temporary lock in the segment so that the linking member can pass through the opening of the temporary lock, the linking member being temporarily locked to the segment due to a frictional resistance produced between the opening of the temporary lock and the linking member;
   aligning together the segment into which the linking member is inserted and one of the segments to which the nut is secured; and
   screwing the linking member into the nut to fasten both segments together and link them in the pipe-length direction.

2. A pipe rehabilitation method according to claim 1, wherein the sheet is fixed to one of the side plates or to one of the inner plates.

3. A pipe rehabilitation method according to claim 1, wherein the sheet is provided at the opening with breaks so that the linking member can be inserted into the opening.

4. A pipe rehabilitation method in which segments are linked in the circumferential and pipe-length directions to install a rehabilitation pipe inside an existing pipe, each of the segments comprising an inner surface plate, side plates provided upright on both sides extending in the circumferential direction of the inner surface plate, and inner plates provided upright between the side plates, the method comprising:
   securing a plurality of nuts to the segments along the circumferential direction thereof;
   preparing a linking member that can be screwed into one of the secured nuts;
   inserting the linking member into a segment;
   temporarily locking the linking member to the segment to prevent the inserted linking member from falling out of the segment using a temporary lock comprised of two side sheets each having at its center an opening for admitting insertion of the linking member and an upper sheet integral with the side sheet, the upper sheet having a length in the pipe-length direction that is substantially the same as a distance between one of the side plates and one of the inner plates or between two of the inner plates and is placed between the side plate and the inner plate or between the two inner plates so that the linking member is temporarily locked to the segment due to a frictional resistance produced between the opening of the temporary lock and the linking member;
   aligning together the segment into which the linking member is inserted and one of the segments to which the nut is secured; and
   screwing the linking member into the nut to fasten both segments together and link them in the pipe-length direction.

5. A pipe rehabilitation method in which segments are linked in the circumferential and pipe-length directions to install a rehabilitation pipe inside an existing pipe, each of the segments comprising an inner surface plate, side plates provided upright on both sides extending in the circumferential direction of the inner surface plate, and inner plates provided upright between the side plates, the method comprising:

securing a plurality of nuts to the segments along the circumferential direction thereof;

preparing a linking member that can be screwed into one of the secured nuts;

inserting the linking member into a segment;

temporarily locking the linking member to the segment to prevent the inserted linking member from falling out of the segment using a temporary lock member comprised of a sheet having an opening into which the linking member is inserted so that the linking member is temporarily locked to the segment by a frictional resistance produced between the opening of the sheet and the linking member;

aligning together the segment into which the linking member is inserted and one of the segments to which the nut is secured; and screwing the linking member into the nut to fasten both segments together and link them in the pipe-length direction.

6. A pipe rehabilitation method according to claim 5, further comprising passing the linking member through a notch formed in a side of the sheet and extending downwardly from the opening until the linking member is inserted into the opening.

7. A pipe rehabilitation method according to claim 5, wherein the sheet has a plurality of breaks extending radially from the opening and a notch formed in a side of the sheet and extending downwardly from the opening; and further comprising passing the linking member through the notch until the linking member reaches the opening and the breaks allow the linking member to be easily pushed and inserted into the opening.

8. A pipe rehabilitation method in which segments are linked in the circumferential and pipe-length directions to install a rehabilitation pipe inside an existing pipe, each of the segments comprising an inner surface plate, side plates provided upright on both sides extending in the circumferential direction of the inner surface plate, and inner plates provided upright between the side plates, the method comprising:

securing a plurality of nuts to the segments along the circumferential direction thereof;

preparing a linking member that can be screwed into one of the secured nuts;

inserting the linking member into a segment;

temporarily locking the linking member to the segment to prevent the inserted linking member from falling out of the segment using a temporary lock member disposed between a first pair of adjacent plates defined by one of the side plates and one of the inner plates of the segment or a second pair of adjacent plates defined by two of the inner plates of the segment, the temporary lock member having two portions disposed generally parallel to the first pair of adjacent plates or the second pair of adjacent plates and a third portion disposed between the two portions along the pipe-length direction and having a length substantially equal to a distance between the first pair of adjacent plates or the second pair of adjacent plates, each of the two portions of the temporary lock member having an opening aligned with one another and through which the linking member extends so that the linking member is temporarily locked to the segment due to a frictional resistance produced between the openings of the temporary lock member and the linking member;

aligning together the segment into which the linking member is inserted and one of the segments to which the nut is secured; and screwing the linking member into the nut to fasten both segments together and link them in the pipe-length direction.

9. A pipe rehabilitation method according to claim 8, wherein each of the two portions of the temporary lock member has a plurality of breaks extending radially from the opening and a notch formed in a side and extending downwardly from the opening; and further comprising passing the linking member through the notches until the linking member reaches the openings and the breaks allow the linking member to be easily pushed and inserted into the openings.

10. A pipe rehabilitation method in which segments are linked in the circumferential and pipe-length directions to install a rehabilitation pipe inside an existing pipe, the method comprising:

providing a plurality of segments each comprising an inner surface plate, and side plates and end plates provided upright on a peripheral edge of the inner surface plate;

linking the plurality of segments in the circumferential direction thereof to form a plurality of closed ring-shaped pipe units, each of the segments of each pipe unit having a plurality of nuts secured thereto at a plurality of locations in the circumferential direction;

inserting linking members into each of the segments of each pipe unit and temporarily locking each linking member to the corresponding segment to prevent the inserted linking member from falling out of the segment, wherein each of the linking members is temporarily locked to the corresponding segment by a temporary lock member comprised of a sheet having an opening into which the linking member is inserted so that the linking member is temporarily locked to the segment by a frictional resistance produced between the opening of the sheet and the linking member;

positioning the pipe units adjacent one another in the pipe-length direction to align the segments of each pipe unit with the segments of an adjacent one of the adjacent pipe units while the linking members are temporarily locked to each segment; and sequentially linking the pipe units to one another in the pipe-length direction by securely engaging the linking members temporarily locked to the segments of each pipe unit with the respective nuts of the adjacent one of the pipe units.

11. A pipe rehabilitation method according to claim 10, further comprising passing the linking member through a notch formed in a side of the sheet and extending downwardly from the opening until the linking member is inserted into the opening.

12. A pipe rehabilitation method according to claim 10, wherein the sheet has a plurality of breaks extending radially from the opening and a notch formed in a side of the sheet and extending downwardly from the opening; and further comprising passing the linking member through the notch until the linking member reaches the opening and the breaks allow the linking member to be easily pushed and inserted into the opening.

13. A pipe rehabilitation method in which segments are linked in the circumferential and pipe-length directions to install a rehabilitation pipe inside an existing pipe, the method comprising:

providing a plurality of segments each comprising an inner surface plate, and side plates and end plates provided upright on a peripheral edge of the inner surface plate;

linking the plurality of segments in the circumferential direction thereof to form a plurality of closed ring-shaped pipe units, each of the segments of each pipe unit having a plurality of nuts secured thereto at a plurality of locations in the circumferential direction;

inserting linking members into each of the segments of each pipe unit and temporarily locking each linking member to the corresponding segment to prevent the inserted linking member from falling out of the segment, wherein each of the linking members is temporarily locked to the corresponding segment by a temporary lock member disposed between a first pair of adjacent plates defined by one of the side plates and one of the inner plates of the segment or a second pair of adjacent plates defined by two of the inner plates of the segment, the temporary lock member having two portions disposed generally parallel to the first pair of adjacent plates or the second pair of adjacent plates and a third portion disposed between the two portions along the pipe-length direction and having a length substantially equal to a distance between the first pair of adjacent plates or the second pair of adjacent plates, each of the two portions of the temporary lock member having an opening aligned with one another and through which the linking member extends so that the linking member is temporarily locked to the segment due to a frictional resistance produced between the openings of the temporary lock member and the linking member positioning the pipe units adjacent one another in the pipe-length direction to align the segments of each pipe unit with the segments of an adjacent one of the adjacent pipe units while the linking members are temporarily locked to each segment; and sequentially linking the pipe units to one another in the pipe-length direction by securely engaging the linking members temporarily locked to the segments of each pipe unit with the respective nuts of the adjacent one of the pipe units.

14. A pipe rehabilitation method according to claim 13, wherein each of the two portions of the temporary lock member has a plurality of breaks extending radially from the opening and a notch formed in a side and extending downwardly from the opening; and further comprising passing the linking member through the notches until the linking member reaches the openings and the breaks allow the linking member to be easily pushed and inserted into the openings.

\* \* \* \* \*